Figure 1:
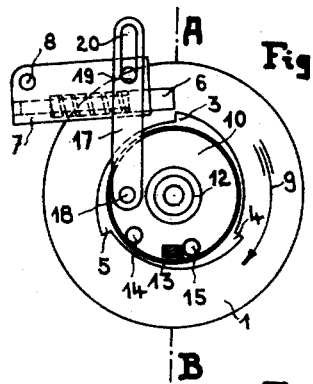

Feb. 19, 1929.

H. JOACHIM 1,702,302

DEVICE FOR STOPPING CINEMATOGRAPHIC PROJECTION APPARATUS

Filed Jan. 21, 1925

Inventor:
Hermann Joachim
by:
Hans Hederich,
Attorney

Patented Feb. 19, 1929.

1,702,302

UNITED STATES PATENT OFFICE.

HERMANN JOACHIM, OF CASSEL, GERMANY.

DEVICE FOR STOPPING CINEMATOGRAPHIC PROJECTION APPARATUS.

Application filed January 21, 1925, Serial No. 3,871, and in Germany January 24, 1924.

My invention relates to cinematographic projection apparatus. It has proved necessary of late to change in certain cases from the cinematographic projection proper, i. e. from the projection of series-forming continuous pictures, to single or individual ones. I do not stop, however, the projection apparatus itself while running, for instance by pawls engaging cam disks, whereby the apparatus would be destroyed in a short time, but in the first place the driving device is switched for running in the reverse direction whereby the rotatory speed that normally amounts to about from 20 to 40 revolutions per second is reduced. Owing hereto, the projection apparatus will come to a standstill for a short time and then be rotated by the driving device in the reverse direction. The rotatory speed of the apparatus in the reverse direction is at first only small, and this is the proper time to make use of pawls adapted to stop the apparatus while it is slowly moving in the reverse direction. In other words: the contrivance just stated renders it possible to stop the apparatus while its speed is only very small so that the wear and tear in so far as caused by the stopping is also very small and practically no damage at all is done thereby.

The principle of the new stopping arrangement consists, therefore, in reversing by means of a convenient switch suddenly the direction of rotation of the driving motor so that the motor which revolves normally in forward direction is suddenly reversed by changing the armature wires or fields. One of the means used for this purpose is a braking device on the projector which is constructed so that the stopping can take place only when a complete picture is shown in the projection window and when the obturating wing of the rotating shutter or the intermediate wing are not standing in the path of the rays. The braking mechanism acts in such a manner that it does not permit of any back rotation of the projector if a film picture is just standing in the projection window and if no obturating wing or intermediate wing is standing in the path of the rays. When the reversing of the engine takes place at a moment when two pictures are behind the projection window or when the intermediate wing is in the path of the rays, the braking does not set in at once but the whole mechanism is rotated back until the single picture which has advanced too far has been pushed back into the projection window and the obturating wing or intermediate wing has got again out of the path of rays.

This arrangement presents the advantage that the stopping occurs very rapidly and equally well at continuous current as at alternating current, the film picture, which has to be inspected, being securely held stationary or being even brought back behind the window.

The circulating shutter can consequently remain as it is.

In order to provide also for movement in the reverse direction, the above-mentioned mechanism is provided with means permitting to disconnect it temporarily from the member normally preventing it from moving in the other direction. The arrangement and combination of the parts concerned is such that certain particular or selected pictures can be repeatedly shown for instance in a lecture.

I am aware of the fact that there exist already devices for stopping cinematographic apparatus, but they operate either in this way that only the film driving drums are stopped, whereas the other rotatory members continue to run, or in that way that the entire apparatus is stopped by short-circuiting the driving electro-motor. Especially this provision suffers from the drawback that in the majority of cases the revolving shutter is not stopped just in that position in which the rays can pass freely through the aperture of the shutter, but there enter more or less frequently opaque parts of the rotary shutter into the path of the rays and intercept the latter. It is in such a case necessary to remove manually the obstacle from the path of the rays. Similar disturbances are being caused by the intermittent sprocket which stops in most cases in that position in which the film is being moved forward. The film is, thus, not in the proper position as regards the picture to be projected next, and manual regulation becomes necessary in order to place that picture just in front of the film gate.

Disturbances of the kinds stated in the preceding paragraph are perfectly dispensed with by the present improved device in that the apparatus is stopped only when the path of the rays is not in the least obstructed and the intermittent sprocket stops the film accurately in proper position.

Figure 2:
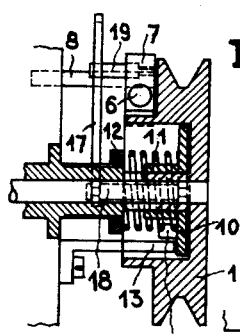
Figure 8:
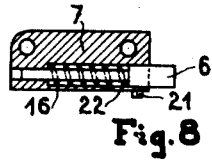
Figure 3:
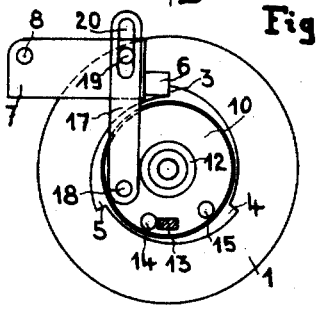
Figure 4:
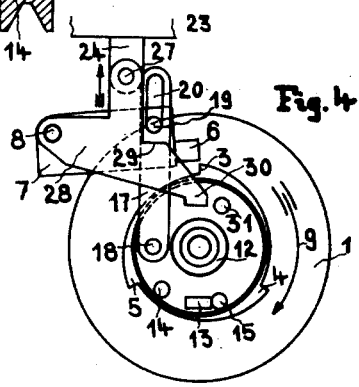
Figure 5:
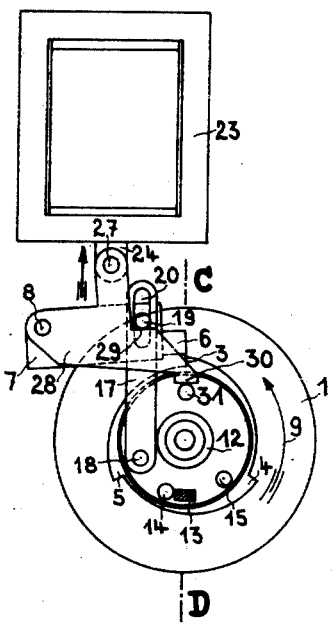
Figure 6:
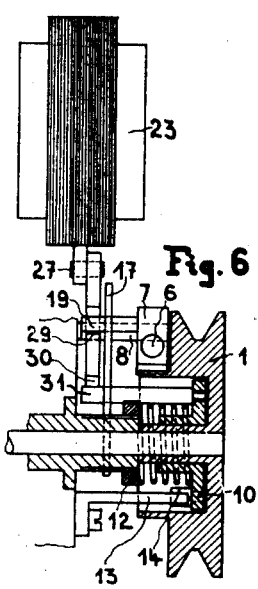
Figure 7:
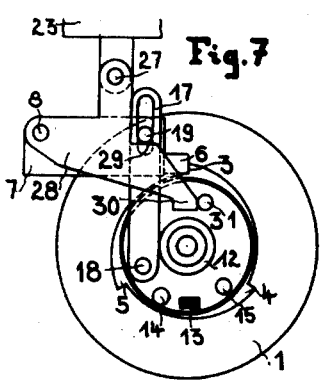

The invention is illustrated diagrammatically and by way of examples on the accompanying drawing, on which Figure 1 is a front-view of a stopping device designed according to this invention and shown in its normal condition in which it is running forward, viz, in the direction indicated by the arrow 9; this constructional form is not combined with a return-device. Figure 2 is a section in the plane A—B of Figure 1. Figure 3 is a view very similar to Figure 1, only a braking member (6) being in another position, in which it has engaged a cam (3); Figure 4 shows the mechanism illustrated in Fig. 1 combined with a return device and running forward, as in Fig. 1. Figure 5 shows the same combination as in Fig. 4, but running backwards, this figure showing also a magnet by which the return device is actuated. Figure 6 shows a section in the plane C—D of Fig. 5. Figure 7 is a view similar to Figs. 4 and 5 and shows certain parts in another position. And Figure 8 shows a longitudinal section through the member 7 of all figures, in connection with some neighbouring parts.

The driving disk 1 (Figs. 1 and 2) of the cinematographic projection machine is driven by means of a belt or cord 2 from a driving motor not shown.

The driving disk 1 which serves at the same time as fly wheel of the projector has on its inner circumference three cams 3, 4 and 5. A rod-shaped spring-controlled abutment 6, the holder 7 of which is pivotally mounted on the axle 8 fixed on the projector, contacts with one of said cams when the direction of rotation of the motor is reversed. The rod-shaped abutment 6 is movably mounted in the holder 7 and advanced by the action of a spring 16 into the working position so that when the cams 3, 4, 5 strike against the free end of said abutment the kinetic energy of the fly wheel is intercepted by the spring. The cams are so adjusted with regard to the gear mechanism so that when they strike against the abutment 6 an entire picture stands behind the picture window and the circulating shutter stands in front of the objective the rays can therefore freely traverse this objective.

In order that at the forward revolution of the machine, indicated by the arrow 9, the abutment 6 does not strike against the cams 3, 4, 5 means are provided which serve to lift the abutment at the forward rotation over the cams. This lifting is effected by a friction disk 10 which is pressed against the belt pulley 1 by the action of the spring 11 and of a nut 12.

The rotation of the friction disk 10 is limited by a stop 13 fixed on the projector, pins 14 and 15 fixed on the friction disk bearing against said stop. This limited movement of the friction disk is transmitted by an arm 17 upon the abutment holder 7.

The drawing illustrates a position in which the driving mechanism is adjusted for backward revolving, the cam 3 having come in contact with the spring controlled abutment 6 and the pin 14 of the friction disk being in contact with the stop 13 owing to this backward rotation, whereby the arm 17, which pivotally mounted on a pin 18 has been pulled down such a distance that the pin 19 fixed on the holder 7 is free of the lower end of the slot 20 in the arm 17. In order to prevent the abutment 6 from being suddenly pushed forward by the helical spring 16 its movement is limited by a screw 21 screwed into the head, which engages with slot 22 of holder 7.

Fig. 7 illustrates the same arrangement as Figs. 1 and 2 however in connection with an arrangement for allowing the running backward of the apparatus. This arrangement is also shown in the stopping position, the driving mechanisms being in the position for the running backward. If the projector has to run backward current is supplied to the electro-magnet 23 wherefrom results that the core 24 of the magnet is attracted in the direction of the arrow 25.

With core 24 an abutment plate 28 is rigidly connected by an axle 27, said plate being oscillably mounted on the axle 8. The pin 19 fixed on the holder 7 bears further upon the edge 29 of the abutment plate 28 so that when the electromagnet attracts not only the abutment plate 28 but also the holder and by the same the abutment 6 is attracted.

The plate 28 has further an arm 30 which, when the core is attracted by the magnet bears against the stud 31 fixed on the friction disk 10 and prevents the holder 7 from dropping down. Owing to the interval between the fixed abutment 13 and pin 14, the driving gear being in the position for backward revolution and current being supplied to the electromagnet, the friction disk is at first rotated backward until the pin 14 has come in contact with pin 13 and the pin 31 has come in contact from below with the arm 30. The slot 20 in lever 17 permits this short backward rotation.

I claim:—

1. A device for stopping cinematographic projection apparatus fitted with a reversible driving gear comprising in combination a driving disk of the projection machine having three cams projecting from its hub, an abutment rod which stops said driving disk in one of three determined positions as soon as the driving gear is reversed and one of the said cams strikes against said rod, and means for lifting said abutment rod out of the path of said cams when the driving gear is rotating in normal forward direction.

2. A device for stopping cinematographic projection apparatus fitted with a reversible driving gear comprising in combination a driving disk of the projection machine having three cams the position of which corresponds with the position of the projection apparatus at which the picture window is filled with a complete picture, said cams projecting from the hub of said disk, an abutment rod which stops said driving disk in one of three determined positions as soon as the driving gear is reversed and one of said cams strikes against said rod, and means for lifting said abutment rod out of the path of said cams when the driving gear is rotating in normal forward direction.

3. A device for stopping cinematographic projection apparatus fitted with reversible gear comprising in combination a driving disk of the projection machine having three cams projecting from its hub, an abutment rod against which one of said cams strikes when the driving gear is reversed, a holder for said abutment rod pivotally mounted on the machine frame, a spring in said holder for pressing said abutment rod into the working position, and means for lifting said abutment rod out of the path of said cams when the driving gear is rotating in normal forward direction.

4. A device for stopping cinematographic projection apparatus fitted with a reversible driving gear comprising in combination a driving disk of the projection machine having three cams projecting from its hub, an abutment rod which stops said driving disk in one of three determined positions as soon as the driving gear is reversed and one of the said cams strikes against said rod, and means for lifting said abutment rod out of the path of said cams when the driving gear is revolving in normal forward direction.

5. A device for stopping cinematographic projection apparatus fitted with a reversible driving gear comprising in combination a driving disk of the projection machine having three cams projecting from its hub, an abutment rod which stops said driving disk in one of three determined positions as soon as the driving gear is reversed and one of the said cams strikes against said rod, means for lifting said abutment rod out of the path of said cams when the driving gear is revolving in normal forward direction, said means consisting of a friction disk in said driving disk, a spring for pressing said friction disk against said driving disk, two studs on said friction disk at a convenient distance the one from the other, a stop on said projection machine and between said studs for limiting the rotation of said friction disk, an arm hingedly fixed on said friction disk and having a slot in its upper end, and a stud on the holder of the abutment rod, said stud engaging with said slot of said hinged arm.

6. A device for stopping cinematographic projection apparatus fitted with a reversible driving gear comprising in combination a driving disk of the projection machine having three cams projecting from its hub, an abutment rod which stops said driving disk in one of three determined positions as soon as the driving gear is reversed and one of the said cams strikes against said rod, means for lifting said abutment rod out of the path of said cams when the driving gear is revolving in normal forward direction, said means consisting of a friction disk in said driving disk, a spring for pressing said friction disk against said driving disk, two studs on said friction disk at a convenient distance the one from the other, a stop on said projection machine and between said studs for limiting the rotation of said friction disk, an arm hingedly fixed on said friction disk and having a slot in its upper end, a stud on the holder of the abutment pin said stud engaging with said slot of said hinged arm, means for rendering said stopping device inoperative when the projection apparatus has to be driven backward, said means consisting of an electromagnet arranged above said driving disk, an armature of said electromagnet, an abutment plate pivotally connected with said armature and carrying said stud of the holder for the abutment rod so that when said armature is being attracted by the electromagnet not only said abutment plate but also said holder are raised out of the path of said cams of the driving disk.

In testimony whereof I affix my signature.

HERMANN JOACHIM.